US006793415B2

(12) United States Patent
Arbuckle

(10) Patent No.: US 6,793,415 B2
(45) Date of Patent: Sep. 21, 2004

(54) SLIP RING ASSEMBLY AND METHOD

(75) Inventor: James F. Arbuckle, Fresno, CA (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 10/278,333

(22) Filed: Oct. 23, 2002

(65) Prior Publication Data

US 2003/0103770 A1 Jun. 5, 2003

Related U.S. Application Data

(60) Provisional application No. 60/334,800, filed on Nov. 30, 2001.

(51) Int. Cl.[7] .............................................. G03B 17/00
(52) U.S. Cl. ........................ 396/427; 352/243; 348/373
(58) Field of Search ................................ 396/419, 427; 348/173

(56) References Cited

U.S. PATENT DOCUMENTS

| | | | | |
|---|---|---|---|---|
| 3,758,714 A | * | 9/1973 | Herndon ...................... | 348/173 |
| 4,673,268 A | * | 6/1987 | Wheeler et al. ............ | 396/419 |
| 5,394,209 A | * | 2/1995 | Stiepel et al. ............... | 396/427 |
| 6,479,813 B2 | * | 11/2002 | Takada et al. .............. | 396/427 |

* cited by examiner

Primary Examiner—Christopher E Mahoney
(74) Attorney, Agent, or Firm—Gunster, Yoakley & Stewart, P.A.

(57) ABSTRACT

A slip ring assembly for use in a rotational camera. The camera has a rotating plate portion and a stationary base. The assembly comprises a housing, the housing having a body with a longitudinal axis, a top end and a bottom end. The top end of the housing includes an inner cylinder protruding therethrough, and upon the cylinder, a plurality of connectors rotationally coupled to the rotating portion of the camera. The second end of the housing is affixed to the stationary portion of the camera. The top end and the bottom end of the housing rotate with respect each other. The slip ring assembly acts as a connector, joining the rotational and the stationary portions of the rotational camera. The present invention minimizes component wear in the camera's stationary base since the end of the assembly in the stationary portion and all of the wires and electrical components coupled to it remain stationary during rotation of the camera. By eliminating the rotation of electrical components and wiring, less component wear occurs and the wiring is less likely to become tangled within the camera's stationary portion during rotation of the upper, rotating portion of the camera.

20 Claims, 5 Drawing Sheets

SLIP RING ASSEMBLY AND METHOD

CROSS-REFERENCE TO RELATED APPLICATION

This application is related to and claims priority to U.S. Provisional Application Ser. No. 60/334,800, filed Nov. 30, 2001, entitled REMOTE CONTROLLED CAMERA SYSTEM, the entirety of which is incorporated herein by reference.

STATEMENT REGARDING FEDERALLY SPONSORED RESEARCH OR DEVELOPMENT n/a

FIELD OF THE INVENTION

The present invention relates to rotating device platforms, and in particular, to improved features for rotatable, titltable camera positioning systems.

BACKGROUND OF THE INVENTION

Many configurations are known in the art for rotating and tilting a movable camera. Typical devices for moving a camera include pan and tilt devices and dome drive devices. Both pan and tilt devices and dome drive devices operate to accept control signals to move a camera to view a desired location. The prior art devices are comprised of a complex assembly of multiple parts which require great expenditures of labor for construction. In such arrangements, multiple parts lead to inefficiencies in assembly as well as failure during operation.

During the operation of the rotating camera it is necessary to provide an electrical connection between a stationary base component and a rotating base component of the camera in order to send and receive electrical signals from components within the rotating base component, such as tilt motors, focus motors and zoom motors, and to relay electrical signals from the camera back to the stationary base. Prior art systems and methods of constructing a flexible, rotatable, electrical connection between the stationary and rotatable components of a camera typically use sliding electrical contacts or integral slip rings as are known in the art.

A typical prior art rotating camera base uses a slip ring component typically configured with wiring harnesses attached to a first end and a second end of the slip ring component. The use of such wiring harnesses creates several attendant disadvantages. The use of extended wires in a sensitive electrical system creates electrical noise interference due to the electromagnetic fields created through the wires. In such a situation it becomes necessary to insulate or shield the electrical wires to reduce the electromagnetic field produced thereby. One such method of insulation of shielding is to use ferrite beads to break the magnetic field and thereby reduce electromagnetic current interference with other electrical systems within the components. The manufacture and installation of multiple wiring harnesses using multiple ferrite beads results in increased materials expenses, as well as increased labor expenses. Further, the use of insulation and shielding is an inadequate solution to the problem of electrical interference.

Other prior art rotating camera systems use a multiple fastener technique to attach the slip ring component to the stationary component. This increases both material costs and assembly costs while further complicating assembly and repair of the unit. For example, a typical prior art device consists of at least six discrete components: a slip ring, at least one ferrite bead, three connectors, and various hardware components.

Therefore, it would be desirable to provide a system and method of communicating electrical signals from a stationary base to a rotational portion of a moveable camera which overcomes the attendant disadvantages present in the prior art.

SUMMARY OF THE INVENTION

The present invention provides a method and apparatus for minimizing component wear in a rotational camera and maintaining electrical connections between a rotating camera base and a fixed base. The invention comprises a slip ring assembly that advantageously couples the rotational portion of the camera to the stationary portion. One portion of the assembly remains fixed within the stationary base of the camera during rotation, while another portion freely rotates within the rotational section of the camera. By eliminating the rotation of one portion of the assembly, less wear occurs and wiring is less likely to become tangled within the camera.

According to one aspect of the invention, a slip ring assembly is provided for use in a rotating device platform. The camera includes a movable portion and a stationary portion. The assembly includes a housing, the housing having a body with a longitudinal axis, a top end region and a bottom end region, the top end region of the housing having a rotating portion rotationally coupled to the revolving portion of a rotating camera. The second end region is affixed to the stationary portion of the camera, wherein the rotational portion of the housing and the second end region of the housing rotate with respect each other.

According to another aspect of the invention, a rotating camera system is provided, which includes a stationary base, a rotating portion rotatably affixed to the stationary base, a motor for controlling the rotational movement of the camera, and a slip ring assembly. The slip ring assembly includes a housing, the housing having a body with a longitudinal axis, a top end region and a bottom end region, the top end region of the housing having a rotating portion rotationally coupled to the revolving portion of a rotating camera. The second end region is affixed to the stationary portion of the camera, wherein the rotational portion of the housing and the second end region of the housing rotate with respect each other. The rotating portion further includes electrical connectors thereon. The housing includes a stationary portion affixed to the stationary portion of the camera, the stationary portion having electrical connectors thereon, wherein the rotating portion and the stationary portion of the housing rotate with respect each other. The housing may further include a mounting flange for supporting the housing. The mounting flange includes an orifice to allow the top end and the bottom end of the housing to protrude therethrough. The top, rotating portion of the housing is rotatable with In yet another aspect of the present invention, a method for minimizing frictional wear on components of a rotating camera system is provided. The method includes the steps of providing a housing having a longitudinal axis, the housing having a rotational component and a fixed component, coupling the rotational component to a rotating portion of a camera, and coupling the fixed component to the stationary portion of the camera, wherein the rotational component and the fixed component rotate with respect each other.

BRIEF DESCRIPTION OF THE DRAWINGS

A more complete understanding of the present invention, and the attendant advantages and features thereof, will be

DETAILED DESCRIPTION OF THE INVENTION

Initially, it is noted that the slip ring system described herein is particularly well suited for use in remotely controlled security cameras, as well as devices which are operable to pan in the horizontal direction and tilt in the vertical direction, or vice versa. The present invention advantageously increases reliability and reduces the number of steps for assembly and cost of materials of such devices. Further, the present invention provides an integral slip ring attachment mechanism as well as an improved horizontal rotation bearing support system. The advantages of the present invention will be more fully understood with reference to the Figures.

Figure 1:
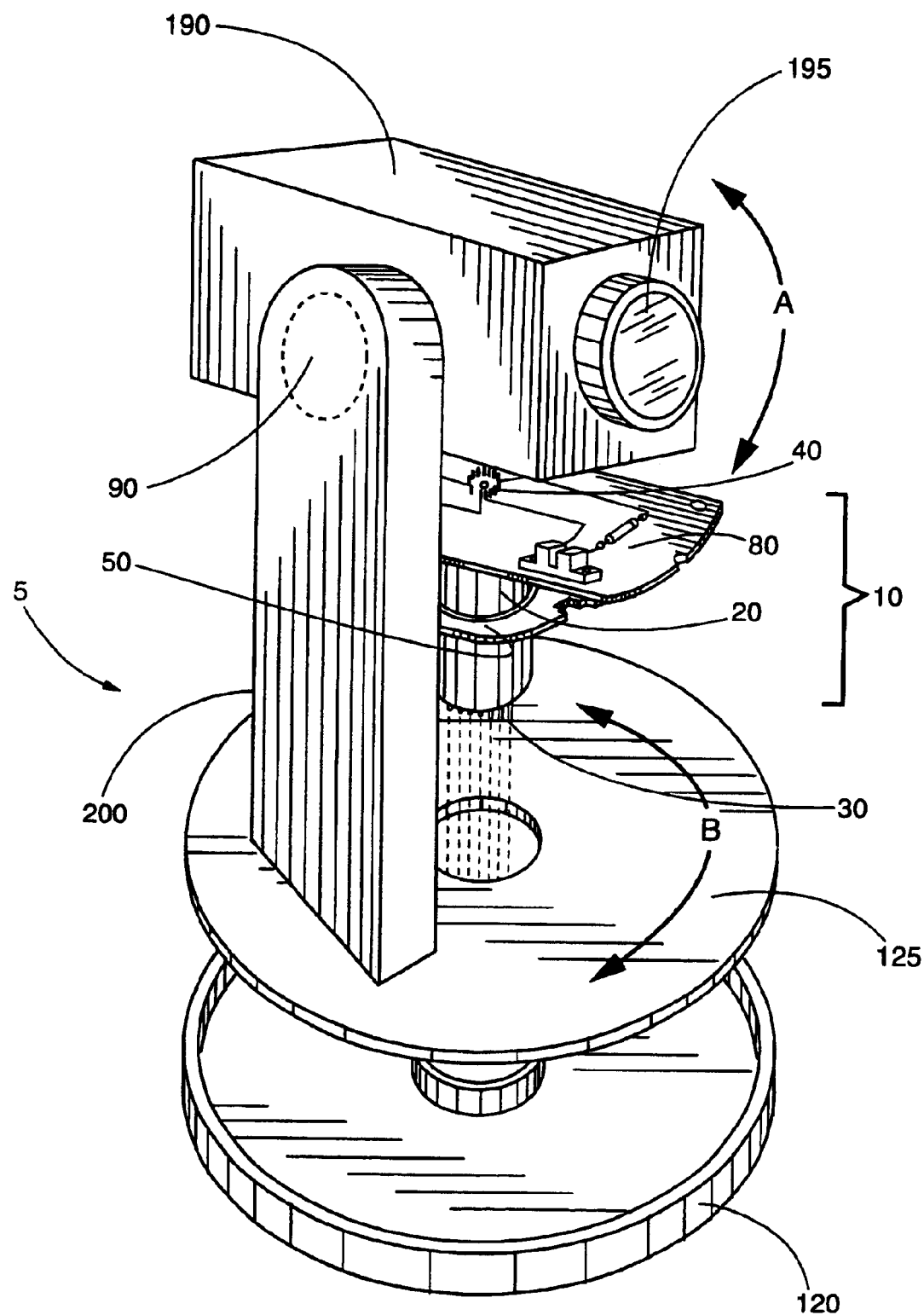
FIG. 1 is an exploded view of a rotatable camera incorporating the slip ring assembly of the present invention.

Referring now to the drawing Figures in which like reference designators refer to like elements, there is shown in FIG. 1 an exploded perspective view of a rotatable camera incorporating the slip ring assembly 10 of the present invention. It is to be understood that the rotatable camera illustrated in FIG. 1 is only an example of one type of rotatable camera. It is within the scope of the present invention to provide a novel slip ring assembly that can be incorporated into any rotatable camera employing separate rotatable and stationary portions.

Rotating camera assembly 5 is comprised of a motor housing 190 having a camera lens 195. Motor housing 190 is pivotally mounted to support 200 via pivoting wheel 90. Support 200 allows motor housing 190 to be tilted up and down in a substantially vertical direction as shown by directional arrow A in FIG. 1. A camera dome (not shown) is fitted over the components of the camera assembly. The dome includes a substantially vertical slot, which, after the dome is fitted over camera assembly 5, allows lens 195 unobstructed access therethrough, thereby allowing lens 195 a full range of vertical rotation in order to capture images substantially in front of the camera.

Support 200 is also attached to revolving pan 125. Revolving pan 125 rotates 360 degrees upon a stationary base 120 as shown by the directional arrows indicated as B. Revolving pan 125 rotates in a plane substantially perpendicular to the plane of rotation of motor housing 190. As revolving pan rotates, motor housing 190 rotates in the same horizontal direction due to its connection with support 200. The rotation of motor housing 190 allows lens 195 a full 360 degree range of horizontal rotational movement in order to capture images in any direction. Rotation of revolving pan 125 can be controlled either manually or by a motor upon receipt of a control signal.

Figure 2:
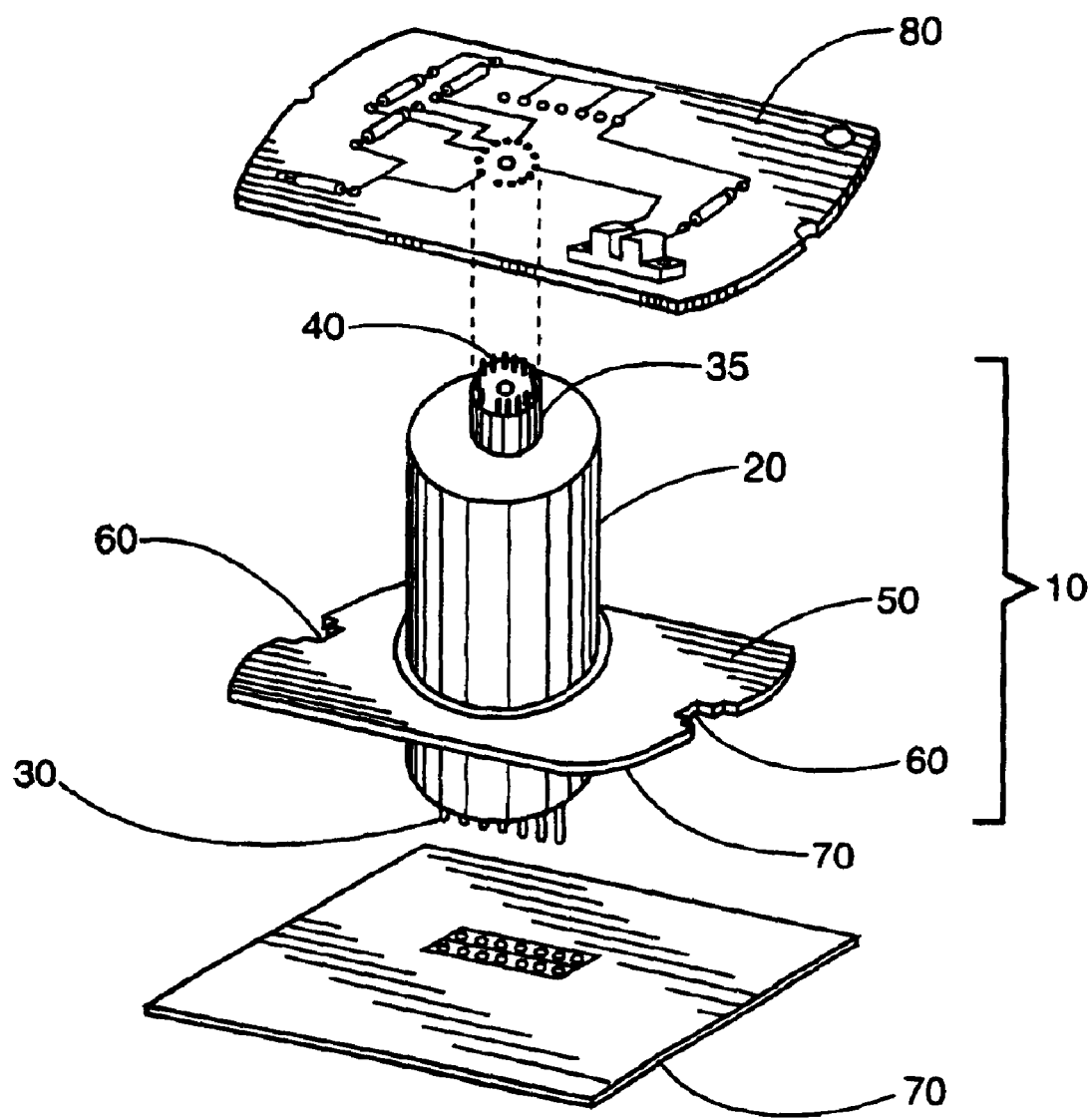
FIG. 2 is an exploded perspective view of the slip ring assembly of the present invention interfacing with opposing circuit boards.

The slip ring assembly 10 in accordance with the present invention can be seen in its preferred embodiment in FIG. 1 and in greater detail in FIG. 2. Slip ring assembly 10 is inserted within the concentric receptacles in pan 125 and stationary base portion 120 and secured therein. Its purpose is to maintain electrical communication between components in revolving pan 125 and stationary base 120. In addition, because the lower portion of assembly 10 does not rotate and is fixed within stationary base 120, the wear on assembly 10 and the components thereon is minimized.

Referring now to FIG. 2, assembly 10 is shown in greater detail. Exemplary construction materials for assembly 10 include plastics, metals, alloys, or combinations thereof. In an exemplary embodiment, assembly 10 has a substantially cylindrical housing, a top end and a bottom end in which the housing is constructed from plastic. It will readily be understood that construction techniques available in the prior art can facilitate various alternate materials configurations of the components of the invention.

Assembly 10 includes a substantially cylindrical housing 20 having electrical connector pins 40 and 30 disposed at a respective top and bottom end thereof. Protruding from the top end of housing 20 is an internal cylinder 35 upon which connector pins 40 are mounted. Cylinder 35 and connector pins 40 are adapted to rotate with respect to housing 20 and connector pins 30. Further provided proximate the bottom end of housing 20 is a mounting flange 50 having opposing engagement notches 60. Housing 20 is configured such that its top end and bottom end rotate relative to one another to thereby allow rotational differentiation between connector pins 30 and 40 while maintaining electrical conductivity and to prevent electrical wiring connected to each end from becoming twisted during rotation of the camera.

Provided within the interior of housing 20 is an electrical lead arrangement which facilitates continuous electrical connection between connector pins 30 and connector pins 40 in a manner where individual connector pins correlate to the same individual connector pin even during rotation. The specific arrangement of components within the housing 20, which allows the slip ring to operate, is not within the scope of this invention and is not discussed herein. The design of housing 20 allows connector pins 40 mounted on the top end of housing 20 to be inserted directly into an electrical receptacle such as a first printed circuit board (PCB) 80. PCB 80 is coupled to revolving pan 125 and can also be arranged as an integral part thereof. PCB 80, located within the revolving portion of a rotational camera includes among other things circuitry that allows for the rotational control of the rotational part of the camera. PCB 80 receives control signals from the stationary base portion of the camera and transmits these control signals to motor housing 190.

The rotating portion of the camera, which includes revolving pan 125, motor housing 190 and camera lens 195, rotates freely, while the circuitry within the rotational portion of the camera (PCB 80) remains in electrical communication with stationary base 120 via assembly 10. PCB 70 is a second printed circuit board located within the camera's stationary base 120. Assembly 10 provides an electrical path between connector pins 40 (and PCB 80) and connector pins 30 (and PCB 70) via the electrical lead arrangement within housing 20.

Connector pins 30 may be connected to circuitry within stationary base 120 or may be inserted within a connector receptacle on PCB 70 (as shown in FIG. 2). Additionally, connector pins 30 may be inserted into PCB 70 in the same fashion as connector pins 40 are inserted within PCB 80.

Alternately, connector pins 30 and 40 may be soldered to their respective PCBs. Regardless of the method used to affix the connector pins to their respective PCBs, internal cylinder 35, because its rotation is independent of the housing 20 in which it resides, allows connector pins 40, and therefore PCB 80 to which it is affixed, to freely rotate within rotational pan 125. The second end of assembly 10 remains fixed within stationary base 120 and therefore does not rotate. Further, PCB 70 and any wiring connected thereto, does not rotate, therefore reducing component wear and the likelihood that wiring within the stationary base will become twisted, tangled and/or damaged.

FIG. 2 also shows mounting flange 50 with complementary opposing notches 60 along its outer edges securing housing 20 within the stationary base 120 of the camera. Mounting flange 50 facilitates the insertion of assembly 10 with the camera assembly. The interior of pan 125 includes a plurality of tabs that engage engagement notches 60 on mounting flange 50. These tabs closely engage engagement notches 60 within stationary base 120 to further insure the integrity of a locked position when the components of the camera are assembled.

Figure 3:
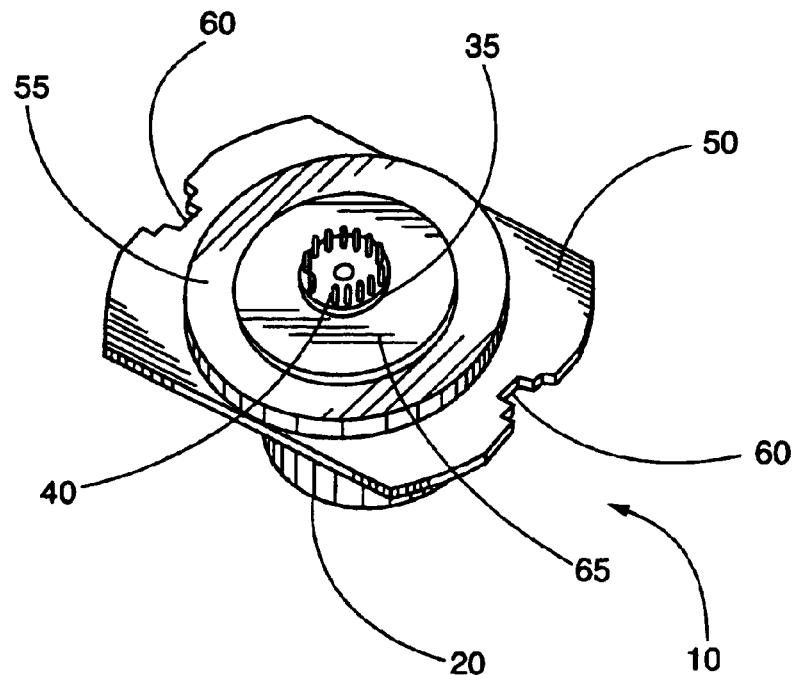
FIG. 3 is a perspective view of the top end of the slip ring assembly of the present invention.

Referring now to FIG. 3, a top perspective view of assembly 10 is shown. Mounting flange 50 further includes concentric outer and inner rings, 55 and 65, respectively. Rings 55 and 65 protect the protruding shaft of internal cylinder 35. Connector pins 40 extend from the top of internal cylinder 35 and can be affixed to or protrude through or be soldered to PCB 80, as shown in FIGS. 1 and 2.

Housing 20 includes internal cylinder 35 therein. The top portion of internal cylinder 35 extends from device 20 and includes connector pins 40 as shown in FIG. 3. Internal cylinder 35 and the electrical connector pins 40 extending therefrom rotate along with PCB 70 within pan 125. This allows for ease of rotation of camera lens 195 within the rotational portion of the camera while maintaining the electrical connection between electrical components in the stationary base 120.

Also shown in FIG. 3 is mounting flange 50 disposed near the second end of housing 20. Provided on mounting flange 50 are notches 60, which are configured to facilitate mounting of the assembly 10 within the rotating camera. Connector pins 40 are shown with multiple pins protruding from internal cylinder 35 of the top end of housing 20 in a circular pattern. The pins are configured to either plug into a receptacle or to be soldered into the PCB. It will be readily understood that the configuration of the pins can be provided otherwise such as a straight line of pins, a square, a rectangle, etc.

Figure 4:
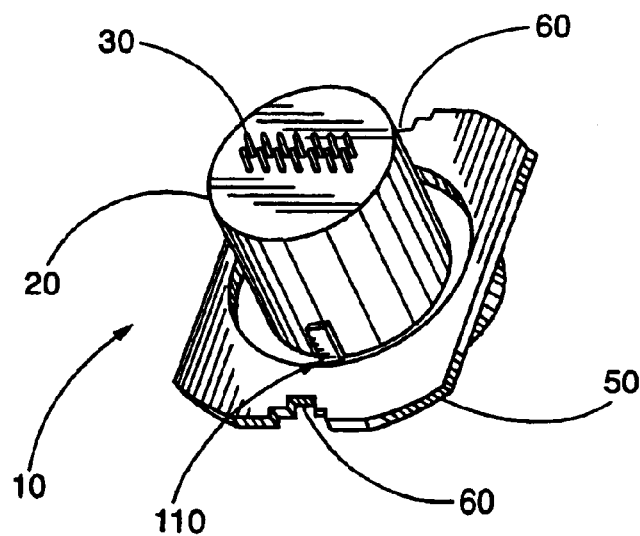
FIG. 4 is a perspective view of the bottom end of the slip ring assembly of the present invention.

FIG. 4 is a bottom perspective view of assembly 10 showing the non-rotational connector pins 30. Connector pins 30 protrude from the bottom end of housing 20 for facilitating electrical connectivity with PCB 70. The bottom end may be spring-loaded into stationary base 120 allowing connector pins 30 to protrude through the underside of base 120 for soldering with PCB 70 or connector pins 30 may be arranged to allow assembly 10 to be removably plugged into a mating connector on PCB 70. In this manner, initial fabrication and subsequent repair is simplified by connectorizing the electrical connectivity between PCB 70 and assembly 10. The arrangement of connector pins 30 is shown in a parallel double line arrangement although other configurations are possible.

Because connector pins 30 extend from device 20 and connector pins 30 extend from internal cylinder 35 which is internal to device 20, the two sets of connector pins rotate with respect to each other, minimizing the twisting of wires and damage to internal components of the camera assembly 5. Further provided on housing 20 is a mounting tab 110. Mounting tab 110 is provided to facilitate interaction with a mounting receptacle when aligning assembly 10 in stationary base 120 of the camera.

Figure 5:
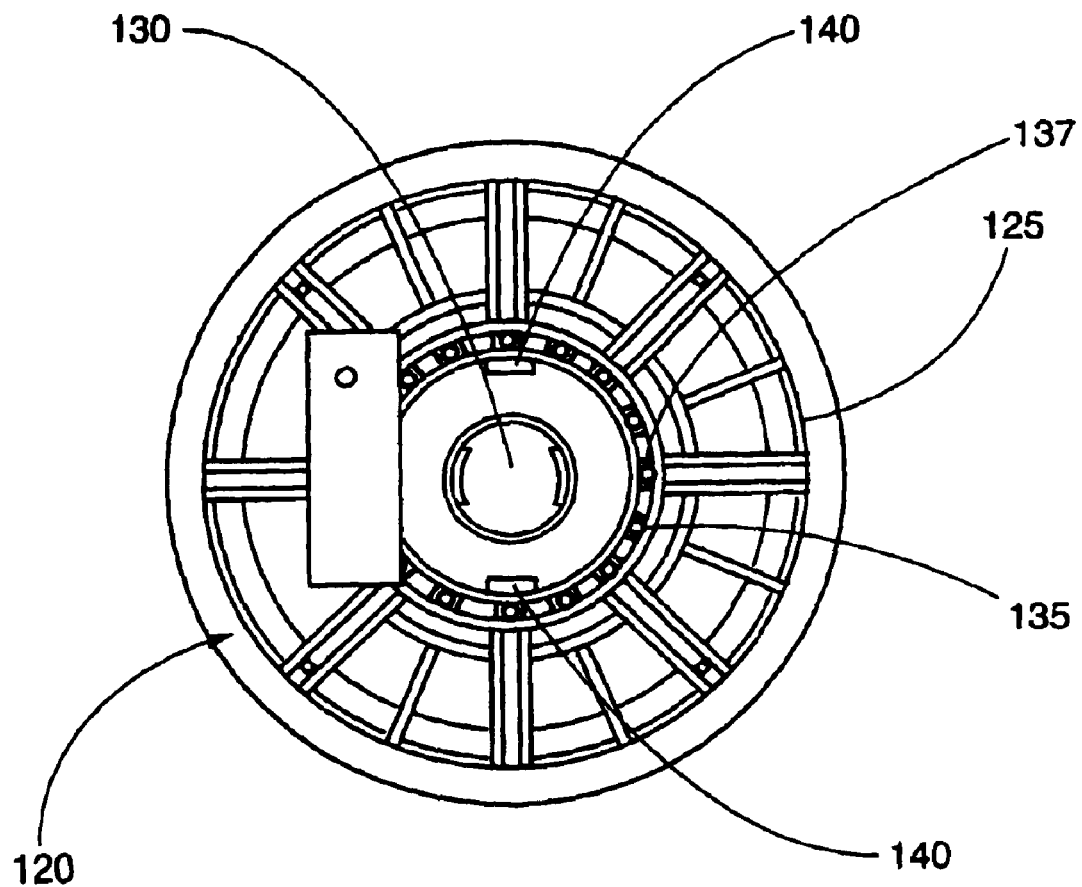
FIG. 5 is a top view of the stationary base and rotating pan used in conjunction present invention.

FIG. 5 shows an exemplary top view of the base of a rotational camera comprised of stationary base 120, and revolving pan 125. Stationary base 120 has a receptacle 130 for receiving housing 20 of assembly 10 therein. Further provided are retaining clips 140, which are configured to interact with notches 60 on mounting flange 50 when housing 20 is inserted into receptacle 130. Retaining clips 140 are preferably integrated as part of stationary base 120.

Revolving pan 125 is comprised of an substantially annular pan that swivels on stationary base 120. Revolving pan 125 can be made to rotate upon stationary base 120 via a variety of ways. In the preferred embodiment, a plurality of ball bearings 135 are disposed between the interior race of stationary base 120 and the exterior race of revolving pan 125, as shown in FIG. 5. Each ball bearing 135 is held in place between a pair of raised protrusions 137 within the exterior race of revolving pan 125. These raised protrusions act as compartments to maintain each ball bearing in proper alignment thereby allowing revolving pan 125 to freely rotate about stationary base 120. The raised protrusions are only an exemplary embodiment of the invention. Alternately, the ball bearings may be fitted between the interior race of the stationary base 120 and the exterior race of the revolving pan 125 without the raised protrusions. The exemplary pan bearing attachment assembly shown in FIG. 5 provides an easier, faster, and lower cost assembly of a drive system, than was previously available. It is within the scope of the present invention to provide other rotting mechanisms commonly known in the art to allow revolving pan 125 to freely and smoothly rotate about stationary base 120.

Figure 6:
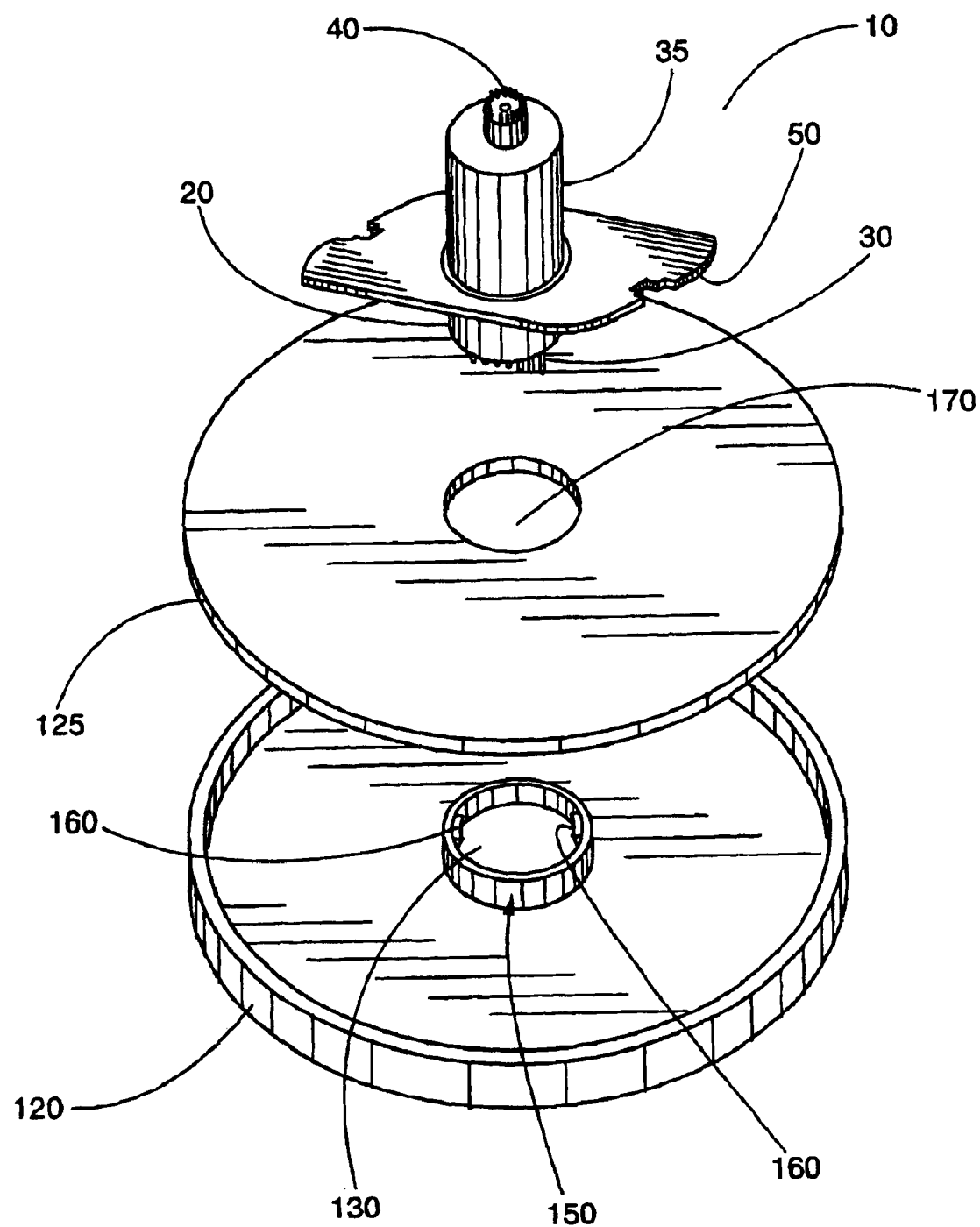
FIG. 6 is an exploded view showing the relationship between the stationary base, the rotating pan and the slip ring assembly of the present invention.

FIG. 6 is an exploded view of assembly 10, revolving pan 125 and stationary base 120 depicting an intended assembly of the three components. Affixed to revolving pan 125 is a motor housing and a camera lens (as shown in FIG. 1). The rotation of rotating pan 125 can be controlled by a remote control, which sends control signals to the stationary base portion of the camera. The electrical connection of the stationary base 120 to the revolving portion of the camera, via assembly 10, provides activation signals to the motor within motor housing 190, which in turn, rotates the camera lens. The slip ring assembly 10 of the present invention is utilized in order to maintain the connection between the electrical components of the camera lens (via PCB 70) and the electrical components within stationary base 120 (via PCB 80) while eliminating rotation of components and wiring within the stationary base.

Stationary base 120 further includes a mounting spindle 150 having snap clips 160 provided around its periphery. Revolving pan 125 is configured with an aperture 170 for slipping over the spindle 150 to attach to stationary base 120.

In practice, when revolving pan 125 is assembled to stationary base 120, snap clips 160 engage the inner rim of revolving pan 125 to fixedly attach the two components. An internal diameter of spindle 150 is provided to correspond to the outside diameter of housing 20 of assembly 10. Housing 20 is configured to slidably engage the internal diameter of the mounting spindle 150. By this arrangement, the installation of assembly 10 within mounting spindle 150 increases the connection forces applied by snap clips 160 to the rim around aperture 170 of revolving pan 125.

A close fit between the assembly 10 and the snap clips 160 ensure the integrity of locked position of the assembly. This advantageously provides a way to securely and economically fasten rotating pan 125 to base 120 while at the same time aligning assembly 10 with an axis of the rotating camera pan 125.

Referring now to FIGS. 1 and 2, upon receipt of rotational control signals from stationary base 125, the motor within motor housing 190 is activated, and rotational pan 125 begins to rotate, along with lens 195. The motor can be any suitable drive motor, such as a stepper motor. The motor housing can be coupled to a series of pulleys and drive belts, which allows pan 125 and the components thereon to rotate freely and without encumbrance upon stationary base 120. During rotation, the second end of assembly 10, and all the components attached thereto, continues to remain fixed and non-rotational within stationary base 120. Motor housing 190, in addition to being able to rotate up and down in a vertical direction, rotates horizontally and in the same direction as pan 125 due to the attachment of motor housing 190 to pan 125 via support 200. PCB 80, which is internal to the rotating portion of the camera, rotates in the same direction as pan 125 due to its connection with connector pins 40 on the rotating top end of assembly 10. The bottom end of assembly 10 is locked into place within stationary base 120. Because the bottom end of assembly 10 and PCB 70 to which it is affixed, does not rotate within base 120, damage to assembly 10 can be avoided since friction due to rotation is eliminated. Further, there is no possibility of wires within stationary base 120 becoming tangled due to rotation.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A slip ring assembly fix use with a rotating device platform having a movable portion and a stationary portion, the assembly comprising:

a housing, having a body with a longitudinal axis, a top end region and a bottom end region, the top end region of the housing having a rotating portion rotationally coupled to the movable portion of the platform, the rotating portion having a plurality of electrical connector ems protruding from the top, the bottom end region of the housing having a fixed portion affixed to the stationary portion of the platform, the fixed portion having an electrical connector, wherein the rotational portion and the fixed portion of the housing rotate with respect to each other.

2. The slip ring assembly of claim 1 wherein the rotating portion is an internal cylindrical member substantially coaxial with the longitudinal axis of the housing, the internal member being rotatable within the housing.

3. The slip ring assembly of claim 1 wherein the housing includes electrical connectors which are spring loaded for coupling with the stationary portion of the platform.

4. The slip ring assembly of claim 1 wherein the housing further comprises a mounting flange to facilitate positioning and mounting of the assembly within the device platform.

5. The slip ring assembly of claim 4 wherein the mounting flange includes one or more notches to facilitate positioning of the mounting flange within the device platform.

6. The slip ring assembly of claim 1 the plurality of electrical connector pins affixed to a printed circuit board included as part of the movable portion of the platform.

7. The slip ring assembly of claim 6 wherein the plurality of electrical connector pins are soldered to the printed circuit board.

8. The slip ting assembly of claim 1 wherein the electrical connector of the fixed portion comprises a plurality of electrical connector pins protruding from the bottom of the fixed portion.

9. A rotating camera system comprising:

a stationary portion;

a movable portion rotatably affixed to the stationary portion;

a camera attached to the movable portion;

a motor for controlling the rotational movement of the camera; and a slip ring assembly, comprising:

a housing having a body with a longitudinal axis, a top end region and a bottom end region, the top end region of the housing having a rotating portion rotationally coupled to the movable portion of the rotating camera system, the rotating portion having a plurality of electrical connector pins protruding from the top, the end region of the housing having a fixed portion affixed to the stationary portion of the rotating camera system, the fixed portion having an electrical connector, wherein the rotating portion and the fixed portion of the housing rotate with respect each to other.

10. The rotating camera system of claim 9 wherein the movable portion is an internal cylindrical member substantially coaxial with the longitudinal axis of the housing, the internal member being rotational within the housing.

11. The rotating camera system of claim 9 wherein the housing includes electrical connectors for removably electrically coupling the slip ring assembly with the stationary portion.

12. The rotating camera system of claim 9 wherein the housing further comprises a mounting flange to facilitate positioning and mounting of the assembly within the rotating camera system.

13. The rotating camera system of claim 11 wherein the mounting flange includes a channel to allow the top end region and the bottom end region of the housing to protrude therethrough, the rotating portion of the housing rotatable with respect to the bottom end region of the housing and the mounting flange.

14. The rotating camera system of claim 13 wherein the mounting flange includes one or more notches to facilitate positioning of the mounting flange within the rotating camera system.

15. The rotating camera system of claim 8 wherein the plurality of electrical connector pins are affixed to a printed circuit board located within the movable portion of the rotating camera system.

16. The rotating camera system of claim 15 wherein the plurality of electrical connector pins are soldered to the printed circuit board.

17. The rotating camera system of claim 9 wherein the stationary portion further comprises an interior race, the movable portion further comprises an exterior race, the interior race of the stationary portion in rotational engagement with the exterior race of the movable portion via a plurality of ball bearings disposed therebetween.

18. The rotating camera system of claim 9 wherein the electrical connector of the fixed portion comprises a plurality of electrical connector pins protruding from the bottom of the fixed portion.

19. A slip ring assembly for use in a rotating camera system, the assembly comprising:

a housing having a body, a top end region and a bottom end region, the top end region of the housing having a rowing portion rotationally coupled to a movable portion of a rotating camera, the rotating portion having a plurality of electrical connector pins protruding from the top, the bottom end region being affixed to a stationary portion of the camera, the fixed portion having an electrical connector the top end region and the bottom end region of the housing being rotatable with respect to each other, the housing maintaining electrical communication between components within the movable portion of the camera and components within the stationary portion of the camera; and a mounting flange, the mounting flange including a channel to allow the top end region and the bottom end region of the housing to protrude therethrough, the top end region of the housing rotatable with respect to the bottom end region of the housing and the mounting flange.

20. The slip ring assembly of claim 19 wherein the electrical connector of the fixed portion comprises a plurality of electrical connector pins protruding from the bottom of the fixed portion.

* * * * *

UNITED STATES PATENT AND TRADEMARK OFFICE
CERTIFICATE OF CORRECTION

PATENT NO. : 6,793,415 B2
DATED : September 21, 2004
INVENTOR(S) : James F. Arbuckle It is certified that error appears in the above-identified patent and that said Letters Patent is hereby corrected as shown below:

Column 7,
Line 41, delete "fix" and insert -- for --.
Line 44, delete "," first occurrence.
Line 49, delete "ems" and insert -- pins --.

Column 8,
Line 25, before "end" insert -- bottom --.
Line 43, delete "11" and insert -- 12 --.
Line 53, delete "8" and insert -- 9 --.

Column 9,
Line 7, delete "rowing" and insert -- rotating --.
Line 12, after "connector" insert -- , --.

Signed and Sealed this

Twenty-eighth Day of June, 2005

JON W. DUDAS
*Director of the United States Patent and Trademark Office*